United States Patent
Ruhlmann et al.

(10) Patent No.: US 9,745,475 B2
(45) Date of Patent: Aug. 29, 2017

(54) USE OF A POLYMERIC EMULSION FOR THE SURFACE TREATMENT OF PARTICLES OF MINERAL MATTER

(71) Applicants: COATEX, Genay (FR); OMYA INTERNATIONAL AG, Oftringen (CH)

(72) Inventors: Denis Ruhlmann, Genay (FR); Olivier Guerret, Pern (FR); Jacques Mongoin, Quincieux (FR); Joe McJunkins, Weggis (CH); Djillali Foual, Oftringen (CH); Marc Feller, Wattenwil (CH); Samuel Rentsch, Aarburg (CH)

(73) Assignees: COATEX, Genay (FR); OMYA INTERNATIONAL AG, Oftringen (CH)

( * ) Notice: Subject to any disclaimer, the term of this patent is extended or adjusted under 35 U.S.C. 154(b) by 6 days.

(21) Appl. No.: 14/777,085

(22) PCT Filed: Mar. 12, 2014

(86) PCT No.: PCT/FR2014/050549
§ 371 (c)(1),
(2) Date: Sep. 15, 2015

(87) PCT Pub. No.: WO2014/147321
PCT Pub. Date: Sep. 25, 2014

(65) Prior Publication Data
US 2016/0040014 A1    Feb. 11, 2016

Related U.S. Application Data

(60) Provisional application No. 61/803,550, filed on Mar. 20, 2013.

(30) Foreign Application Priority Data

Mar. 18, 2013 (FR) ...................................... 13 52379

(51) Int. Cl.
| | |
|---|---|
| *C08L 33/08* | (2006.01) |
| *C09C 1/36* | (2006.01) |
| *C09C 3/10* | (2006.01) |
| *C09C 1/02* | (2006.01) |
| *B82Y 30/00* | (2011.01) |
| *C09D 133/06* | (2006.01) |
| *C09D 5/00* | (2006.01) |
| *C09D 7/12* | (2006.01) |
| *C09D 5/02* | (2006.01) |

(52) U.S. Cl.
CPC ............ *C09C 1/3676* (2013.01); *B82Y 30/00* (2013.01); *C08L 33/08* (2013.01); *C09C 1/021* (2013.01); *C09C 3/10* (2013.01); *C09D 5/00* (2013.01); *C09D 5/022* (2013.01); *C09D 7/1225* (2013.01); *C09D 133/06* (2013.01); *C01P 2004/62* (2013.01); *C01P 2004/64* (2013.01); *C01P 2006/12* (2013.01); *C01P 2006/60* (2013.01); *C08L 2201/52* (2013.01)

(58) Field of Classification Search
CPC ................. C08K 9/04; C08J 5/18; C09C 3/08
See application file for complete search history.

(56) References Cited

U.S. PATENT DOCUMENTS

| | | | |
|---|---|---|---|
| 6,140,435 A | 10/2000 | Zanotti-Russo | |
| 2009/0239958 A1* | 9/2009 | Sakanishi | B01F 17/0028 516/9 |
| 2011/0107803 A1 | 5/2011 | Fechner et al. | |
| 2011/0112256 A1 | 5/2011 | Kensicher et al. | |
| 2011/0230387 A1 | 9/2011 | Leyrer et al. | |
| 2013/0116368 A1* | 5/2013 | Suau | C08F 2/24 524/156 |
| 2013/0116377 A1 | 5/2013 | Ruhlmann et al. | |

FOREIGN PATENT DOCUMENTS

| | | |
|---|---|---|
| CN | 101679795 A | 3/2010 |
| WO | WO 2010/001206 A1 | 1/2010 |
| WO | WO 2013/064761 A1 | 5/2013 |
| WO | WO 2013/064763 A1 | 5/2013 |

OTHER PUBLICATIONS

Chinese Office Action issued Sep. 7, 2016 in Patent Application No. 201480012211.5 (Partial English translation only).
International Search Report issued Apr. 17, 2014, in PCT/FR2014/050549 filed Mar. 12, 2014.

\* cited by examiner

*Primary Examiner* — Hannah Pak
(74) *Attorney, Agent, or Firm* — Oblon, McClelland, Maier & Neustadt, L.L.P.

(57) ABSTRACT

The present invention relates to the use of a new polymeric aqueous emulsion for surface treating particles of mineral matter.

11 Claims, No Drawings

USE OF A POLYMERIC EMULSION FOR THE SURFACE TREATMENT OF PARTICLES OF MINERAL MATTER

FIELD OF THE INVENTION

The present invention relates to the use of a new polymeric aqueous emulsion for surface treating particles of mineral matter.

BACKGROUND OF THE INVENTION

In general, particles of mineral matter are used as an inorganic filler in a variety of applications, and especially in paint formulations. The paint formulations likewise comprise a number of other constituents, each having a defined function within the formulation, and especially thickeners, whose function is to control the rheology of the formulations, both at the stage of their manufacture and during their transport, their storage, or in the course of their implementation. The diversity of the practical constraints within each of these steps makes for a multiplicity of different rheological behaviors.

A wide variety of thickeners exist for paint.

Among those thickeners, one can mention natural thickeners based on cellulose of type HEC (hydroxyethylcellulose). One can also mention thickeners called "associative" thickeners, and especially associated thickeners of acrylic variety, described especially in documents EP 0 577 526 A1, EP 1 778 797 A1, EP 2 108 007 A1, EP 2 114 378 A1, EP 2 303 982 A1, FR 2 950 061 A1 and FR 2 956 862 A1.

HASE thickeners are traditionally added at the end of formulation of the paints (post addition) or alternatively in two steps (at the start of formulation, at the pasting stage, and post addition). The reason is that the paint formulator is aiming conventionally to obtain a sufficiently high viscosity during pasting, and in order to achieve this may add some or all of the thickener during pasting. With the aim of simplifying the manufacturing method, the formulator is ready to consider any solution resulting in high viscosities without any need to add additives.

Nowadays there is a demand on the part of formulators to simplify the work of formulating paints. Similarly, for reasons of cost, there are demands for a reduction in the amount of additives in the formulations.

This is the context for the present invention.

More specifically, an object of the present invention is the use of a thickening polymeric aqueous emulsion for surface treating particles of mineral matter.

The work of the paint formulator is thereby simplified through the omission of a compound to be introduced.

The inventors observed, moreover, that by using said surface treated particles of mineral matter, it was possible to reduce the total amount of thickeners required, relative to the independent introduction of particles of mineral matter and then of thickener, while retaining the same rheological profile.

Moreover, the inventors observed that the gloss values of paints containing treated particles of mineral matter of this kind were very greatly improved relative to the paints in which the particles of mineral matter were introduced independently of the thickener.

The polymeric aqueous emulsion used in the context of the present invention has been the object of two patent applications filed in the name of Coatex, under numbers WO 2013/064761 and WO 2013/064763.

DESCRIPTION OF THE INVENTION

Aqueous Emulsion for Surface Treating the Particles of Mineral Matter:

A first object of the present invention is the use of a polymeric aqueous emulsion for surface treating particles of mineral matter.

In the context of the present invention, and for all of the objects claimed, said polymeric aqueous emulsion used for treating the particles of mineral matter is obtained by polymerization of:
i) at least some acrylic acid and/or methacrylic acid monomers,
ii) at least some alkyl acrylate and/or alkyl methacrylate monomers,
iii) at least some monomers having at least one hydrophobic group, said hydrophobic group of these monomers comprising between 6 and 100 carbon atoms,
in the presence, during said polymerization, of:
iv) at least one polyglycerol of formula:

  (I)

in which:
R represents hydrogen, a carbon group comprising between 8 to 22 carbon atoms, or an ester group functionalized by a carbon group comprising between 8 to 22 carbon atoms, and
n represents an integer or decimal number greater than 1, and
v) at least one anionic surfactant.

"At least some acrylic acid and/or methacrylic acid monomers" (monomer i)) means that the emulsion comprises at least some acrylic acid monomers, at least some methacrylic acid monomers, or at least a mixture of acrylic acid and methacrylic acid monomers. The emulsion may further comprise other monomers, especially other anionic monomers having a polymerizable vinyl function and a carboxyl group.

According to one embodiment of the present invention, the emulsion comprises methacrylic acid monomers exclusively as anionic monomers having a polymerizable vinyl function and a carboxyl group.

"At least some alkyl acrylate and/or alkyl methacrylate monomers" (monomer ii)) means that the emulsion comprises at least some alkyl acrylate monomers, at least some alkyl methacrylate monomers, or at least a mixture of alkyl acrylate and alkyl methacrylate monomers. The emulsion may further comprise other monomers, especially other nonionic hydrophobic monomers having a polymerizable vinyl function. For instance, these include esters, amides, or nitriles of acrylic or methacrylic acids, as for example acrylonitrile, vinyl acetate, styrene, methylstyrene, diisobutylene, vinylpyrrolidone or vinylcaprolactam.

"Alkyl" refers to a linear or branched group $C_mH_{2m+1}$, in which m is from 1 to 10, for example from 1 to 6, or from 1 to 3 or 1 to 2.

According to one embodiment of the present invention, the emulsion comprises ethyl acrylate monomers exclusively as nonionic hydrophobic monomers having a polymerizable vinyl function.

"At least some monomers having at least one hydrophobic group, said hydrophobic group of these monomers having between 6 and 100 carbon atoms" (monomers iii)) means that the polymeric aqueous emulsion comprises monomers which in particular possess a hydrophobic group composed of 6 to 100 carbon atoms.

According to one embodiment of the present invention, said hydrophobic group of the monomers iii) represents a linear, branched or ramified hydrocarbon chain comprising from 6 to 40 carbon atoms, or a substituted or unsubstituted aryl or cycloalkyl group comprising from 6 to 100 carbon atoms.

According to another embodiment of the present invention, said hydrophobic group of the monomers iii) represents a linear, branched or ramified hydrocarbon chain comprising from 6 to 40 carbon atoms, as for example from 6 to 30 carbon atoms or from 6 to 20 carbon atoms.

According to yet another embodiment, said hydrophobic group of the monomers iii) represents a substituted or unsubstituted aryl or cycloalkyl group comprising from 6 to 100 carbon atoms, as for example from 6 to 60 carbon atoms or from 6 to 50 carbon atoms.

According to one embodiment of the present invention, said monomers having at least one hydrophobic group in which said hydrophobic group possesses between 6 and 100 carbon atoms (monomers iii)), which make up said aqueous emulsion obtained by polymerization, have a formula (II):

R'-A-R"  (II)

in which:
A represents a polymeric chain composed of:
m alkylene oxide units of formula —$CH_2CHR_1O$— where $R_1$ represents an alkyl group comprising from 1 to 4 carbons, and m is from 0 to 150,
p alkylene oxide units of formula —$CH_2CHR_2O$— where $R_2$ represents an alkyl group comprising from 1 to 4 carbons, and p is from 0 to 150,
n ethylene oxide units where n is from 0 to 150,
wherein m+n+p>4 and wherein the alkylene oxide units of formula: —$CH_2CHR_1O$—, the alkylene oxide units of formula —$CH_2CHR_2O$— and the ethylene oxide units are present in block, alternatively or randomly;
R' represents a radical containing a polymerizable unsaturated function selected from the group consisting of acrylic esters, methacrylic esters, maleic esters, itaconic esters, crotonic esters, acrylurethane, methacrylurethane, α-α'-dimethyl-isopropenyl-benzylurethane, allylurethane, allyl ethers, vinyl ethers, amides and imides; and
R" represents a linear, branched or ramified hydrocarbon chain comprising from 6 to 40 carbon atoms, or a substituted or unsubstituted aryl or cycloalkyl group comprising from 6 to 100 carbon atoms.

According to one embodiment of the present invention, said monomers having at least one hydrophobic group in which said hydrophobic group possesses between 6 and 100 carbon atoms (monomers iii)), which make up said aqueous emulsion obtained by polymerization, have a formula (II):

R'-A-R"  (II)

in which:
A represents a polymeric chain composed of:
m' propylene oxide units of formula —$CH_2CHR_1O$— where $R_1$ represents a methyl group, and m is from 0 to 150,
n ethylene oxide units where n is from 0 to 150,
p is 0,
wherein m+n+p>4 and wherein the propylene oxide units and the ethylene oxide units are present in block, alternatively or randomly;
R' represents a radical containing a polymerizable unsaturated function selected from the group consisting of acrylic esters, methacrylic esters, maleic esters, itaconic esters, crotonic esters, acrylurethane, methacrylurethane, α-α'-dimethyl-isopropenyl-benzylurethane, allylurethane, allyl ethers, vinyl ethers, amides and imides; and
R" represents a linear, branched or ramified hydrocarbon chain comprising from 6 to 40 carbon atoms, or a substituted or unsubstituted aryl or cycloalkyl group comprising from 6 to 100 carbon atoms.

According to one embodiment of the present invention, the group R' in the monomer R'-A-R" of formula (II) represents a radical containing a polymerizable unsaturated function belonging to the group of acrylic, methacrylic, maleic, itaconic, or crotonic esters.

According to one embodiment of the present invention, the group R" in the monomer R'-A-R" of formula (II) represents a linear, branched or ramified hydrocarbon chain comprising from 6 to 40 carbon atoms, as for example from 6 to 30 carbon atoms or from 6 to 20 carbon atoms.

According to another embodiment of the present invention, in the monomer R'-A-R" of formula (II):
R' represents a radical containing a polymerizable unsaturated function belonging to the group of acrylic-, methacrylic-, maleic-, itaconic-, or crotonic esters, and
R" represents a linear, branched or ramified hydrocarbon chain comprising from 6 to 40 carbon atoms, as for example from 6 to 30 carbon atoms or from 6 to 20 carbon atoms.

According to another embodiment of the present invention, in the monomer R'-A-R" of formula (II):
A represents a polymeric chain composed of:
m propylene oxide units of formula —$CH_2CHR_1O$— where $R_1$ represents a methyl group, and m is from 0 to 150,
n ethylene oxide units where n is from 0 to 150,
p is 0,
wherein m+n+p>4 and wherein the propylene oxide units and the ethylene oxide units are present in block, alternatively or randomly,
R' represents a radical containing a polymerizable unsaturated function belonging to the group of acrylic-, methacrylic-, maleic-, itaconic-, or crotonic esters, and
R" represents a linear, branched or ramified hydrocarbon chain comprising from 6 to 40 carbon atoms.

Accordingly, the emulsion used in the context of the present invention is obtained by polymerization of the at least three different categories of monomers stated above, in the presence, during said polymerization, of, in particular, a polyglycerol of formula (I) below:

RO—$(C_3H_6O_2)_n$—H  (I)

in which:
R represents hydrogen, a carbon group comprising between 8 to 22 carbon atoms, or an ester group functionalized by a carbon group comprising between 8 to 22 carbon atoms, and
n represents an integer or decimal number greater than 1.

In the context of the present invention, the polyglycerol of formula (I) is used "during said polymerization". There is therefore no method of adding said polyglycerol to the polymeric solution after polymerization. The reason is that the inventors demonstrated that this is an important feature during the manufacturing of the emulsion used in the context of the present invention. In this regard, reference may be made to the two patent applications filed in the name of Coatex under numbers WO 2013/064761 and WO 2013/064763.

A "polyglycerol" is a compound in which the degree of polymerization is greater than 1, it being possible for this to degree to be an integer number or a decimal number. The term "polyglycerol" encompasses diglycerols, triglycerols, etc.

A "carbon group" means a saturated or unsaturated carbon-containing chain. This carbon-containing chain may especially comprise one or more double bonds.

According to one embodiment of the present invention, R represents an unsaturated carbon group comprising between 8 to 22 carbon atoms.

According to one embodiment of the present invention, R represents an unsaturated carbon group comprising a sole double bond and between 8 to 22 carbon atoms.

According to another embodiment of the present invention, R represents an unsaturated carbon group comprising a sole double bond and between 15 to 22 carbon atoms.

In the context of the present invention, n denotes the average degree of polymerization. This is an integer number or a decimal number greater than 1.

According to one embodiment of the present invention, n represents an integer or decimal number between 1 and 10.

According to another embodiment of the present invention, n represents an integer or decimal number between 1 and 6, as for example an integer number equal to 2 or equal to 4.

According to one embodiment of the present invention, a polyglycerol of formula (I) is such that:
  R represents an unsaturated carbon group comprising a sole double bond and between 8 to 22 carbon atoms, and
  n represents an integer or decimal number between 1 and 8.

The formula (I) for the polyglycerol used during said polymerization may be translated into the following forms:

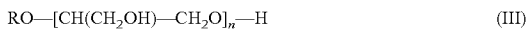
$$RO-[CH(CH_2OH)-CH_2O]_n-H \quad (III)$$

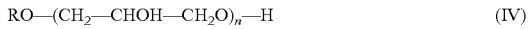
$$RO-(CH_2-CHOH-CH_2O)_n-H \quad (IV)$$

Alternatively, the formula (III) is represented as follows:

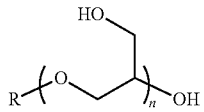

Accordingly, the repeated unit in the formula (I), in other words the $C_3H_6O_2$ unit, may take the following forms: $CH_2$—CHOH—$CH_2O$ (repeated unit of the formula (IV)) or $CH(CH_2OH)$—$CH_2O$ (repeated unit of the formula (III)).

In the compounds of formula (III) and (IV), R and n are as defined above (general definition and various embodiments).

Accordingly:
  R represents hydrogen, a carbon group comprising between 8 to 22 carbon atoms, or an ester group functionalized by a carbon group comprising between 8 to 22 carbon atoms, and
  n represents an integer or decimal number greater than 1.

Said polymerization also takes place in the presence of an anionic surfactant (compound v)).

According to one embodiment of the present invention, this at least one surfactant v) is selected from sodium dodecyl sulfate, sodium dioctyl sulfosuccinate and/or sodium dodecyl benzene sulfonate.

Said polymerization may therefore take place in the presence of other surfactants.

According to one embodiment of the present invention, said polymerization (step a)) takes place in the presence of an additional nonionic surfactant which is different from the compound iv).

According to another embodiment of the present invention, said polymerization (step a)) takes place in the presence of an additional nonionic surfactant which is different from the compound iv) selected from polyoxyethylene glycol and fatty alcohol ethers and from polyoxyethylene glycol esters.

According to one embodiment of the invention, the polymerization step comprises the following substeps:
  a1) water and then compounds iv) and v) are introduced into a synthesis reactor,
  a2) the synthesis reactor is heated to a temperature of at least 60° C.,
  a3) polymerization initiator compounds are introduced into a synthesis reactor, and
  a4) monomers i), ii) and iii), optionally additional water, one or more other compounds v) and/or a chain transfer agent are introduced into a synthesis reactor.

"Polymerization initiator compounds" or alternatively and equivalently, a "polymerization initiator system" refers to a system capable of initiating the polymerization of the monomers. Conventionally this is a chemical compound having the capacity to generate free radicals.

According to one aspect of the present invention, the polymerization initiator system is selected from the group consisting of hydrogen peroxide, sodium persulfates, potassium persulfates, ammonium persulfates, sodium metabisulphites, potassium metabisulphites, ammonium metabisulphites, hydroperoxides, and a mixture of at least two of these compounds.

According to one embodiment of the present invention, a mercaptan RSH is used as chain transfer agent for the polymerization of the monomers. An example is n-dodecyl mercaptan.

In the context of the present invention, consideration may also be given to adding 2-acrylamido-2-methylpropane sulfonic acid to the polymeric aqueous emulsion. This compound may be added at step a4) of the method described above.

According to one embodiment of the present invention, the polymeric aqueous emulsion implements, relative to the total weight of the polymeric aqueous emulsion:
  i) from 20% to 60% by weight of acrylic acid and/or methacrylic acid monomer,
  ii) from 40% to 80% by weight of alkyl acrylate and/or alkyl methacrylate monomers,
  iii) from 0.5% to 25% by weight of monomers having at least one hydrophobic group, said hydrophobic group having between 6 and 100 carbon atoms, in the presence of:
  iv) from 0.1% to 10% by weight of at least one polyglycerol of formula (I), and
  v) from 0.1% to 10% by weight of at least one surfactant different from the compound iv).

According to one embodiment of the present invention, the polymeric aqueous emulsion implements, relative to the total weight of the polymeric aqueous emulsion:
  i) from 30% to 50% by weight of acrylic acid and/or methacrylic acid monomer, ii) from 50% to 70% by weight of alkyl acrylate and/or alkyl methacrylate monomers,
iii) from 5% to 15% by weight of monomers having at least one hydrophobic group, said hydrophobic group comprising between 6 and 100 carbon atoms, in the presence of:
iv) from 1% to 8% by weight of at least one polyglycerol of formula (I), and
v) from 0.5% to 8% by weight of at least one surfactant different from the compound iv).

The polymeric aqueous emulsion described is characterized in that it has a weight-average molecular mass of between 20 000 g/mol and 1 000 000 g/mol, as measured by GPC.

According to one embodiment, the polymeric aqueous emulsion described is characterized in that it has a weight-average molecular mass of between 200 000 g/mol and 1 000 000 g/mol, as measured by GPC.

Method for Preparing Surface Treated Particles:

Another object of the present invention relates to a method for preparing surface treated particles of mineral matter by means of the aforementioned polymeric aqueous emulsion.

More specifically, an object of the present invention relates to a method for preparing surface treated particles of mineral matter, comprising the steps of:
a) preparing a polymeric aqueous emulsion by polymerization of:
  i) at least some acrylic acid and/or methacrylic acid monomers,
  ii) at least some alkyl acrylate and/or alkyl methacrylate monomers,
  iii) at least some monomers having at least one hydrophobic group, said hydrophobic group having between 6 and 40 carbon atoms,
in the presence, during said polymerization, of:
  iv) at least one polyglycerol of formula (I):

RO—(C$_3$H$_6$O$_2$)$_n$—H     (I)

in which:
R represents hydrogen, an alkyl group comprising between 8 to 22 carbon atoms, or an ester group functionalized with an alkyl group comprising between 8 to 22 carbon atoms, and
n represents an integer or decimal number equal to or greater than 1, and
  v) at least one anionic surfactant,
b) providing particles of mineral matter, and
c) contacting the particles of mineral matter from step b) with said polymeric aqueous emulsion obtained in step a).

All of the detailed description relating to the polymeric aqueous emulsion applies here to the method for preparing particles of mineral matter.

In particular, the definitions of the terms "at least some acrylic acid and/or methacrylic acid monomers" (monomer i)), "at least some alkyl acrylate and/or alkyl methacrylate monomers" (monomer ii)) and "at least some monomers having at least one hydrophobic group, said hydrophobic group having between 6 and 100 carbon atoms" (monomer iii)) are identical to the definitions given above concerning the use of the aqueous emulsion for treating the particles.

Surface Treated Particles of Mineral Matter:

Another object of the present invention relates to particles of mineral matter surface treated by a polymeric aqueous emulsion, said polymeric emulsion having been obtained by polymerization of:

i) at least some acrylic acid and/or methacrylic acid monomers,
ii) at least some alkyl acrylate and/or alkyl methacrylate monomers,
iii) at least some monomers having at least one hydrophobic group, said hydrophobic group of these monomers having between 6 and 100 carbon atoms,
in the presence, during said polymerization, of:
iv) at least one polyglycerol of formula (I):

RO—(C$_3$H$_6$O$_2$)$_n$—H     (I)

in which:
R represents hydrogen, an alkyl group comprising between 8 to 22 carbon atoms, or an ester group functionalized with an alkyl group comprising between 8 to 22 carbon atoms, and
n represents an integer or decimal number greater than 1, and
v) at least one anionic surfactant.

All of the detailed description relating to the polymeric aqueous emulsion applies in the present case to the particles of mineral matter treated by means of that emulsion.

According to one embodiment of the present invention, said treated particles of mineral matter are selected from the group consisting of talc, titanium dioxide, gypsum, mica, alumina, kaolin, magnesia, lime, and a mixture of at least two of these mineral matters.

According to one embodiment of the present invention, said treated particles of mineral matter are selected from the group consisting of calcium carbonate (natural or precipitated) and dolomites.

Another object of the present invention relates to surface treated particles of mineral matter as are obtained by the method for preparing the particles as is described above.

According to one embodiment of the present invention, said treated particles of mineral matter are selected from the group consisting of talc, titanium dioxide, gypsum, mica, alumina, kaolin, magnesia, lime, and a mixture of at least two of these mineral matters.

According to one embodiment, said particles of mineral matter are selected from the group consisting of calcium carbonate (natural or precipitated) and dolomites, preferably chalk and/or marble and/or limestone.

Other Objects of the Invention:

Yet another object of the present invention relates to an aqueous formulation comprising the treated particles of mineral matter as described above.

A formulation of this kind may in particular be an adhesive, an aqueous paint, a render coating, or a putty.

Yet another object of the present invention is the use of the treated particles of mineral matter described above for enhancing the gloss of a paint film.

The optical qualities of a paint film may be classed according to different characteristics. These characteristics include opacity, brightness and gloss.

By "opacity" is meant the capacity of a paint film, for a given thickness of application, to produce equivalent coverage of a black-colored substrate and a white-colored substrate. The opacity of a paint film is determined by measuring the luminance $Y_b$ of a paint coat of a given thickness on a black ground, then the luminance $Y_w$ of a coat of the same paint of the same thickness on a white ground. The opacity is the ratio $Y_b/Y_w$.

For a given thickness of application, the person skilled in the art aims to come as close as possible to an opacity of 1.

By "clearness" or "luminance" or even "brightness" is meant the clearness index of the paint film, determined by measuring the component L in the colorimetric space Lab (L*a*b*), by means of a spectrophotometer.

By "gloss" is meant the gloss index of the paint film, determined by means of a glossmeter. Glossmeters illuminate the surfaces to be checked, by means of standardized light and at a standardized angle. They subsequently measure the amount of diametrally reflected light.

The paint film may also be characterized by the measurement of the flow and levelling, which is performed according to the ASTM D-4062 test.

According to one aspect of the present invention, the above-described treated particles of mineral matter are used as an agent for enhancing the gloss of the formulations in which they are present.

An "agent enhancing the gloss of a paint film" means an agent which yields a product of enhanced gloss relative to a product not containing that agent. The product in the present case is a paint film resulting from the application of a predetermined thickness of an aqueous paint formulation. In the context of the present invention, the term "enhanced" means increasing the value of the gloss for a paint formulation comprising a defined quantity of particles of mineral matter treated by the polymeric aqueous emulsion described above, relative to a gloss value for the same paint formulation comprising the same defined amount of untreated particles of mineral matters.

According to one embodiment of the present invention, such formulations are paint formulations having a particle volume concentration (hereinafter PVC) of between 15% and 70%, as for example between 20% and 40%.

The "particle volume concentration" is defined by the formula below:

$$PVC\ (\%) = 100 \times V_f/(V_f + V_b)$$

where $V_f$ represents the volume of mineral fillers and $V_b$ represents the volume of binder in the paint formulation.

According to one embodiment of the present invention, the treated particles of mineral matter, described above, are used as an agent enhancing the gloss of formulations comprising, as mineral fillers, particles of titanium dioxide $TiO_2$ and particles of calcium carbonate $CaCO_3$ surface treated by a polymeric aqueous emulsion.

"Titanium dioxide" or "titanium dioxide particles" refers to particles of rutile or anatase type as obtained by conventional industrial methods from ore, by a sulfate method or by a chloride method, for example.

According to the invention, the $TiO_2$ particles are in the form of suspensions, dispersions in a liquid, or in powder form. When the $TiO_2$ is in powder form, the particles have a granulometry characterized by an average particle size of between 100 and 500 nm, of between 200 and 400 nm, for example—for example, an average size of 250 nm. Such particles are available commercially.

According to another aspect of the present invention, the copolymer as defined above is used as an agent enhancing the optical activity of titanium dioxide particles in a paint formulation having a particle volume concentration (PVC) of between 15% and 50%.

Another, final object of the present invention is the use of the polyglycerol of formula (I) as a polymerization surfactant for preparing a polymeric aqueous emulsion intended for treating particles of mineral matter.

The examples which follow allow the present invention to be appreciated more effectively, but without limiting its scope.

EXAMPLES

Example 1

The object of this example is to illustrate the preparation of a polymeric aqueous emulsion intended for surface treating particles of mineral matter.

More specifically, said aqueous emulsion was obtained by polymerization (% by weight relative to the total weight of monomers) of:
  33.6% by weight of methacrylic acid,
  59.4% by weight of ethyl acrylate,
  7.0% of monomers of formula R'-A-R"(II)

wherein:
  A represents a polymeric chain composed of 25 ethylene oxide units of formula —$CH_2CH_2$—O—
  R' represents the methacrylate function
  R" represents a branched, acyclic, and non-aromatic hydrocarbon chain, more specifically 2-hexyldecanyl (16 carbon atoms), in the presence, during said polymerization, of a polyglycerol-3 of formula (III) where R represents $C_{18}H_{35}$ and n=2 (Chimexane™ NB), and of an anionic surfactant, sodium n-dodecylsulfate.

Weighed out into a 1 liter reactor are 288 g of bi-permuted water, 11.5 g of Chimexane™ and 3.5 g of sodium dodecyl sulfate. This synthesis reactor is heated to 72° C.±2° C.

During this time, a preliminary emulsion is prepared by weighing out the following into a beaker:
  285 g of bi-permuted water,
  3.5 g of sodium dodecyl sulfate,
  102 g of methacrylic acid,
  180 g of ethyl acrylate,
  21 g of macromonomer of formula (I),
  0.64 g of n-dodecyl mercaptan.

The mass of polyglycerol of formula (I) here represents 3.8% of the total mass of the polymer produced. The total mass of anionic surfactant here represents 2.3% of the total mass of polymer produced.

Then 0.95 g of ammonium persulfate diluted in 10 g of bi-permuted water is weighed out for the first catalyst, and 0.095 g of sodium metabisulfite diluted in 10 g of bi-permuted water is weighed out for the second catalyst.

When the synthesis reactor is up to temperature, the two catalysts are added and the polymerization is performed for two hours at 76° C.±2° C., with parallel addition of the preliminary emulsion.

The pump is rinsed with 20 g of bi-permuted water and baking takes place at 76° C.±2° C. for one hour. Lastly, cooling takes place to room temperature, and the resulting dispersion is filtered.

This gives a polymeric aqueous emulsion with a molecular mass of 500 000 g/mol.

The molecular mass of the polymeric aqueous emulsion is determined by GPC.

One technique of this kind employs a WATERS™ liquid chromatography apparatus equipped with a WATERS™ refractometric concentration detector.

The liquid chromatography apparatus includes an isocratic pump (WATERS™ 510) with a flow rate regulated at 0.8 ml/min. The chromatography apparatus further comprises an oven, which itself includes a MZ-Gel SDplus Linear MZ Analysentechnik™ linear column with a length of 30 cm and an internal diameter of 8 mm. The detection system in turn is composed of a RI WATERS™ 2410 refractometric detector. The oven is brought to a temperature of 35° C., and the refractometer is brought to a temperature of 35° C.

This liquid chromatography apparatus is equipped with a size exclusion column suitably selected to separate the different molecular weights of the polymers under study. The liquid elution phase is a 100% THF organic phase.

More specifically, in a first step, the polymerization solution is diluted at 5 mg/ml in the eluant, which in the present case is a 100% THF solution. The resulting solution is then filtered to 0.2 μm. 100 μL of this solution are then injected into the chromatography apparatus (eluant: a 100% THF solution).

The chromatography apparatus is calibrated using eleven polystyrene standards ranging from 700 to 3 053 000 g/mol, of type EasyVial PS-H™ AGILENT POLYMER LABS™.

Example 2

The object of this example is to illustrate the preparation of $TiO_2$ particles surface treated by a polymeric aqueous emulsion as obtained in example 1 above.

More specifically, a Guédu 4,5NO mixer is preheated to 75° C. 1 000 g of $TiO_2$ (Tioxide® RHD2) are added to the mixer. Then 50 g of the aqueous emulsion obtained in example 1 are sprayed in the mixer onto the titanium dioxide $TiO_2$ particles. The resulting surface treated particles are characterized by a treatment rate of 1.5% s/s.

Mixing is carried out for four hours with minimal agitation.

Surface treated $TiO_2$ particles are obtained.

Example 3

The object of this example is to illustrate the preparation of particles of $CaCO_3$ from the Avignon region, France surface treated by a polymeric aqueous emulsion as obtained in example 1 above.

More specifically, a Guédu 4,5NO mixer is preheated to 75° C. 1 000 g of $CaCO_3$ (Omyacoat® 850 OG) are added to the mixer. Then 50 g of the aqueous emulsion obtained in example 1 are sprayed in the mixer onto the $CaCO_3$ particles. The resulting surface treated particles are characterized by a treatment rate of 1.5% s/s.

Mixing is carried out for four hours with minimal agitation.

Surface treated $CaCO_3$ particles are obtained.

Example 4

This example illustrates the partial or complete use of particles of mineral matter surface treated by a polymeric aqueous emulsion according to the invention in an aqueous paint formulation. When the particles of mineral matter are not surface treated or are partially surface treated, thickeners are added to the formulation independently.

Moreover, the paints are formulated in accordance with methods known to the person skilled in the art.

In the context of the example which follows, the measurements of flow and levelling, opacity, whiteness, and gloss are made in the following way:

A film thickness of 150 μm is applied to the surface of a substrate (Leneta® contrast chart) divided into two parts: one black-colored part and one white-colored part.

48 hours are awaited after application of the film to the substrate, which is stored in a room in which the temperature and hygrometry are regulated at 25±2° C. and 45±5% humidity.

The luminance index Y of the film is measured over the black ground ($Y_b$) and then over the white ground ($Y_w$). The opacity is the ratio $Y_b/Y_w$.

On the same substrate, the clearness index of the paint film is also measured, determined by measuring the component L in the colorimetric space Lab (L*a*b*), using a Spectro pen spectrophotometer from Dr Lange.

The gloss measurement is also measured on the same substrate by means of a Micro tri-gloss glossmeter from Byk-Gardner, at an angle of 60° and 85°.

The flow and levelling measurement is carried out on the same contrast chart in accordance with the ASTM D-4062 test.

A determination is also made of the viscosity of said formulations at different shear rates:

at low shear rate, the Brookfield viscosity is measured by means of a Brookfield RVT viscometer, in an unagitated flask, at a temperature of 25° C. and at two speeds of rotation of 10 and 100 revolutions per minute with the appropriate spindle. The reading is taken after one minute of rotation. Accordingly, two Brookfield viscosity measurements are obtained, coded $\mu_{BK10}$ and $\mu_{BK100}$ respectively (mPa·s);

at medium shear rate: the Stormer viscosity, coded $\mu_S$ (Krebs units);

at high shear rate: the Cone Plan viscosity or ICI viscosity, coded $\mu_1$ (poises, 1 P=100 mPa·s).

Test 1

This test illustrates the use of particles of $TiO_2$ and $CaCO_3$ mineral matter which have not been surface treated, and of a prior-art thickener of cellulosic type (Natrosol™ 250 HHR—P) added to the paint formulation independently.

Test 2

This test illustrates the use of particles of $TiO_2$ and $CaCO_3$ mineral matter which have not been surface treated, and of a prior-art thickener of acrylic type (in the present case, a thickener from Coatex®) added to the paint formulation independently.

Test 3

This test illustrates the use of particles of $TiO_2$ and $CaCO_3$ mineral matter which have not been surface treated, and of a thickener of polymeric aqueous emulsion type according to the invention but added to the paint formulation independently.

Test 4

This test illustrates the use of surface treated $TiO_2$ particles obtained according to example 2, and the use of $CaCO_3$ particles which have not been surface treated, and of a thickener of polymeric aqueous emulsion type according to the invention (obtained according to example 1) but added to the paint formulation independently.

Test 5

This test illustrates the use of surface treated particles of mineral matters, $TiO_2$ and $CaCO_3$, obtained respectively according to example 2 and example 3.

TABLE 1

| Paint constituent: | Test 1 | Test 2 | Test 3 Mass (g) | Test 4 | Test 5 |
|---|---|---|---|---|---|
| Water | 260 | 247 | 247 | 256 | 263.3 |
| Dispersant (Coadis ® BR3) | 6.0 | 6.0 | 6.0 | 6.0 | 6.0 |
| Defoamer Agent (Tegofoamex ® 901W) | 3.0 | 3.0 | 3.0 | 3.0 | 3.0 |
| Ionic dispersant (NaOH 20%) | 5.0 | 5.8 | 5.8 | 6.3 | 7.7 |
| Biocide (Acticide ® MBS) | 2.0 | 2.0 | 2.0 | 2.0 | 2.0 |
| Thickener - Natrosol ™ 250 HHR - P | 6.0 | — | — | — | — |
| Acrylic thickener (Coatex ®) | — | 18.2 | — | — | — |
| Emulsion according to the invention | — | — | 18.2 | 8.8 | — |
| Untreated $TiO_2$ | 188 | 188 | 188 | — | — |
| Untreated $CaCO_3$ | 130 | 130 | 130 | 130 | — |
| $TiO_2$ treated with emulsion as per example 1 (1.5% s/s) | — | — | — | 188 | 188 |
| $CaCO_3$ treated with emulsion as per example 1 (1.5% s/s) | — | — | — | — | 130 |
| Binder (Mowilith ® LDM 1871) | 400 | 400 | 400 | 400 | 400 |
| Level of thickener in the formulation (% s/s) | 0.6 | 0.54 | 0.54 | 0.54 | 0.48 |

All of the results are gathered in table 2.

For each of the tests, determinations were made of the flow and levelling, opacity, clearness, gloss, and the BK μ10, BK μ100, ICI and Stormer viscosities, according to the methods described above.

TABLE 2

| Test: | 1 | 2 | 3 | 4 | 5 |
|---|---|---|---|---|---|
| Solids content (%) | 52.4 | 52.3 | 51.9 | 52.1 | 51.8 |
| pH | 9 | 9.1 | 9.1 | 9.1 | 9.1 |
| $μ_{BK10}$ | 21 000 | 14 600 | 20 500 | 20 300 | 16 000 |
| $μ_{BK100}$ | 4 450 | 5 210 | 7 800 | 7 800 | 6 000 |
| $μ_S$ | 111 | 116 | 136 | 135 | 126 |
| $μ_I$ | 0.9 | 1.6 | 1.8 | 1.7 | 1.4 |
| Flow and levelling | 1-2 | 2 | 2-3 | 3 | 3 |
| Opacity | 0.97 | 0.98 | 0.98 | 0.97 | 0.97 |
| Clearness | 98.4 | 98.4 | 98.4 | 98.2 | 97.8 |
| Gloss/white - 60° | 18.9 | 19.2 | 20.8 | 22.2 | 41.2 |
| Gloss/white - 85° | 52.6 | 47.5 | 50.7 | 54.7 | 80.7 |
| Gloss/black - 60° | 17.8 | 18.9 | 20.7 | 22.2 | 40.1 |
| Gloss/black - 85° | 51.5 | 47.5 | 51.4 | 54.4 | 81.8 |

It is noted that the paints will remain stable with respect to storage through measurement of the viscosities (results not shown) at:

1/T=1 week, room temperature, and
2/T=1 week, 50° C.

The invention claimed is:

1. A method for surface treating particles of mineral matter, comprising contacting said particles with a polymeric aqueous emulsion obtained by polymerization of:

i) an acrylic acid or methacrylic acid monomer,
ii) an alkyl acrylate or alkyl methacrylate monomer,
iii) a monomer having at least one hydrophobic group, said hydrophobic group comprising between 6 and 100 carbon atoms, in the presence, during said polymerization, of:

iv) at least one polyglycerol of formula (I):

$$RO-(C_3H_6O_2)_n-H \quad (I)$$

in which:

R represents hydrogen, a carbon group comprising between 8 to 22 carbon atoms, or an ester group functionalized by a carbon group comprising between 8 to 22 carbon atoms, and
n represents an integer or decimal number greater than 1, and v) at least one anionic surfactant agent.

2. The method according to claim 1, wherein the monomer having at least one hydrophobic group has a formula (II):

$$R'-A-R'' \quad (II)$$

in which:

A represents a polymeric chain comprised of:
m alkylene oxide units of formula —$CH_2CHR_1O$— where $R_1$ represents an alkyl group comprising from 1 to 4 carbons, and m is from 0 to 150,
p alkylene oxide units of formula —$CH_2CHR_2O$— where $R_2$ represents an alkyl group comprising from 1 to 4 carbons, and p is from 0 to 150,
n ethylene oxide units where n is from 0 to 150,
wherein m+n+p>4 and wherein the alkylene oxide units of formula —$CH_2CHR_1O$—, the alkylene oxide units of formula —$CH_2CHR_2O$— and the ethylene oxide units are present in block, alternatively or randomly;
R' represents a radical containing a polymerizable unsaturated function selected from the group consisting of acrylic esters, methacrylic esters, maleic esters, itaconic esters, crotonic esters, acrylurethane, methacrylurethane, a-a'-dimethyl-isopropenyl-benzylurethane, allylurethane, allyl ethers, vinyl ethers, amides and imides; and
R" represents a linear or branched hydrocarbon chain comprising from 6 to 40 carbon atoms, or a substituted or unsubstituted aryl or cycloalkyl group comprising from 6 to 100 carbon atoms.

3. The method according to claim 2, wherein the groups R' and R" in the monomer iii) of formula (II):

$$R'-A-R'' \quad (II)$$

are such that:

R' represents a radical containing a polymerizable unsaturated function belonging to the group of acrylic, methacrylic, maleic, itaconic, or crotonic esters, and
R" represents a linear or branched hydrocarbon chain comprising from 6 to 40 carbon atoms.

4. The method according to claim 1, wherein the at least one polyglycerol of formula (I) is at least one polyglycerol of formula (III):

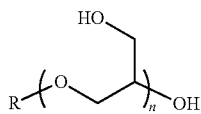
(III)

in which:
R represents hydrogen, a carbon group comprising between 8 to 22 carbon atoms, or an ester group functionalized by a carbon group comprising between 8 to 22 carbon atoms, and
n represents an integer or decimal number greater than 1.

5. The method according to claim 1, wherein said at least one anionic surfactant agent v) is selected from the group consisting of sodium dodecyl sulfate, sodium dioctyl sulfosuccinate and sodium dodecyl benzene sulfonate, and mixtures thereof.

6. The method according to claim 1, wherein said polymerization is conducted in the presence, during said polymerization, of said at least one polyglycerol of formula (I), said at least one anionic surfactant agent, and an additional nonionic surfactant agent which is different from said at least one poly glycerol of formula (I).

7. The method according to claim 1, wherein the polymeric aqueous emulsion is obtained by polymerization of, relative to the total weight of the polymeric aqueous emulsion:
i) from 20% to 60% by weight of the acrylic acid or methacrylic acid monomer,
ii) from 40% to 80% by weight of the alkyl acrylate or alkyl methacrylate monomer,
iii) from 0.5% to 25% by weight of the monomer having at least one hydrophobic group,
in the presence:
iv) of 0.1% to 10% by weight of the at least one polyglycerol of formula (I), and
v) of 0.1% to 10% by weight of the at least one anionic surfactant.

8. Particles of mineral matter surface treated by a polymeric aqueous emulsion, said polymeric emulsion having been obtained by polymerization of:
i) an acrylic acid or methacrylic acid monomer,
ii) an alkyl acrylate or alkyl methacrylate monomer,
iii) a monomer having at least one hydrophobic group, said hydrophobic group comprising between 6 and 100 carbon atoms,
in the presence, during said polymerization, of:
iv) at least one polyglycerol of formula (I):

(I)

in which:
R represents hydrogen, a carbon group comprising between 8 to 22 carbon atoms, or an ester group functionalized by a carbon group comprising between 8 to 22 carbon atoms,
n represents and integer or decimal number greater than 1, and
v) at least one anionic surfactant agent.

9. An aqueous formulation comprising water and the surface treated particles of mineral matter according to claim 8.

10. A method for enhancing gloss of a paint film comprising incorporating the surface treated particles of mineral matter according to claim 8 into said paint film.

11. The method according to claim 1, wherein at least one polyglycerol of formula (I) is at least one polyglycerol of formula (IV):

(IV)

in which:
R represents hydrogen, a carbon group comprising between 8 to 22 carbon atoms, or an ester group functionalized by a carbon group comprising between 8 to 22 carbon atoms, and
n represents an integer or decimal number greater than 1.

* * * * *